Aug. 24, 1926.
J. E. FUSON
1,596,927
PARACHUTE
Filed March 4, 1926    2 Sheets-Sheet 2
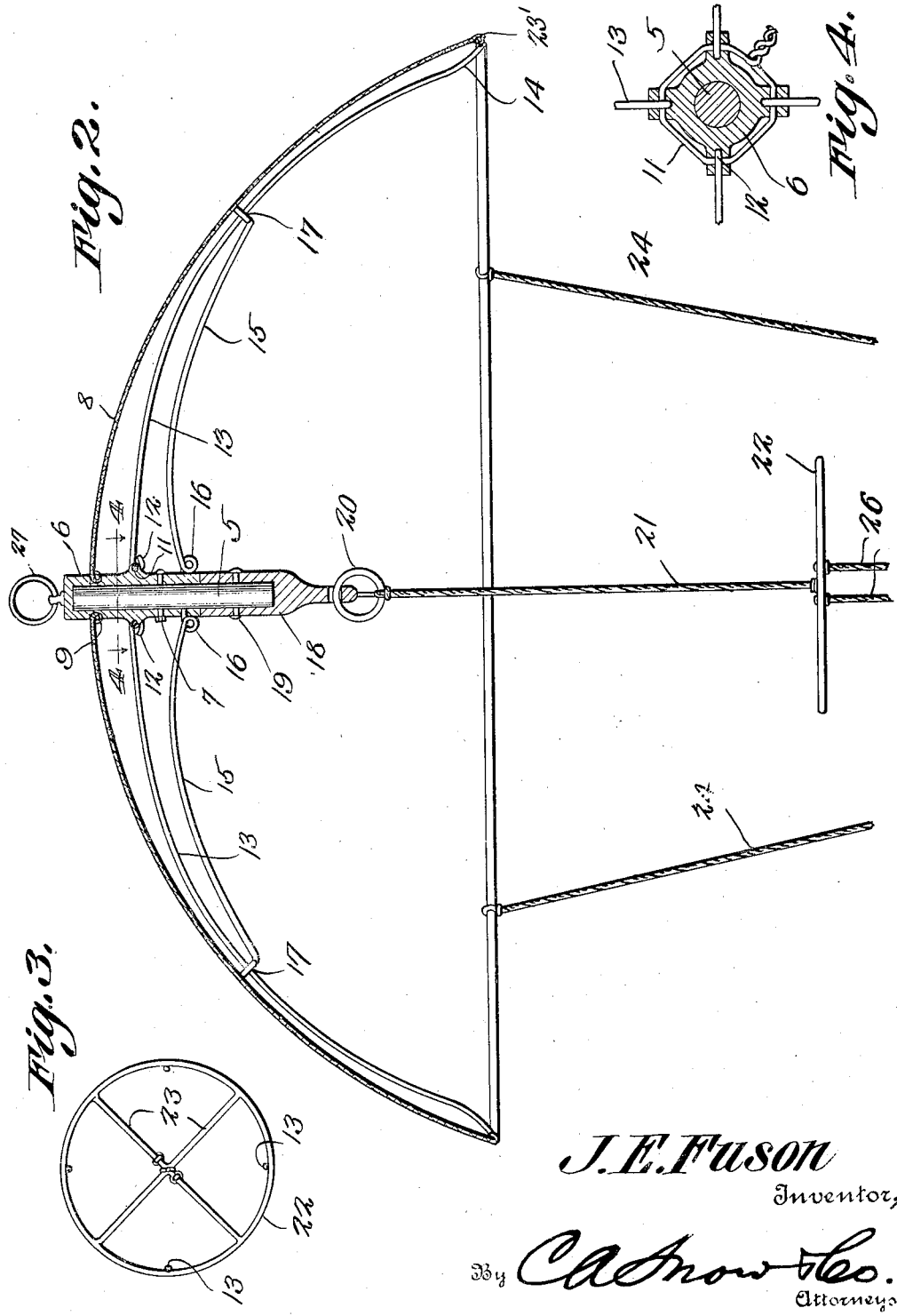
J. E. Fuson
Inventor,
By C. A. Snow & Co.
Attorneys.

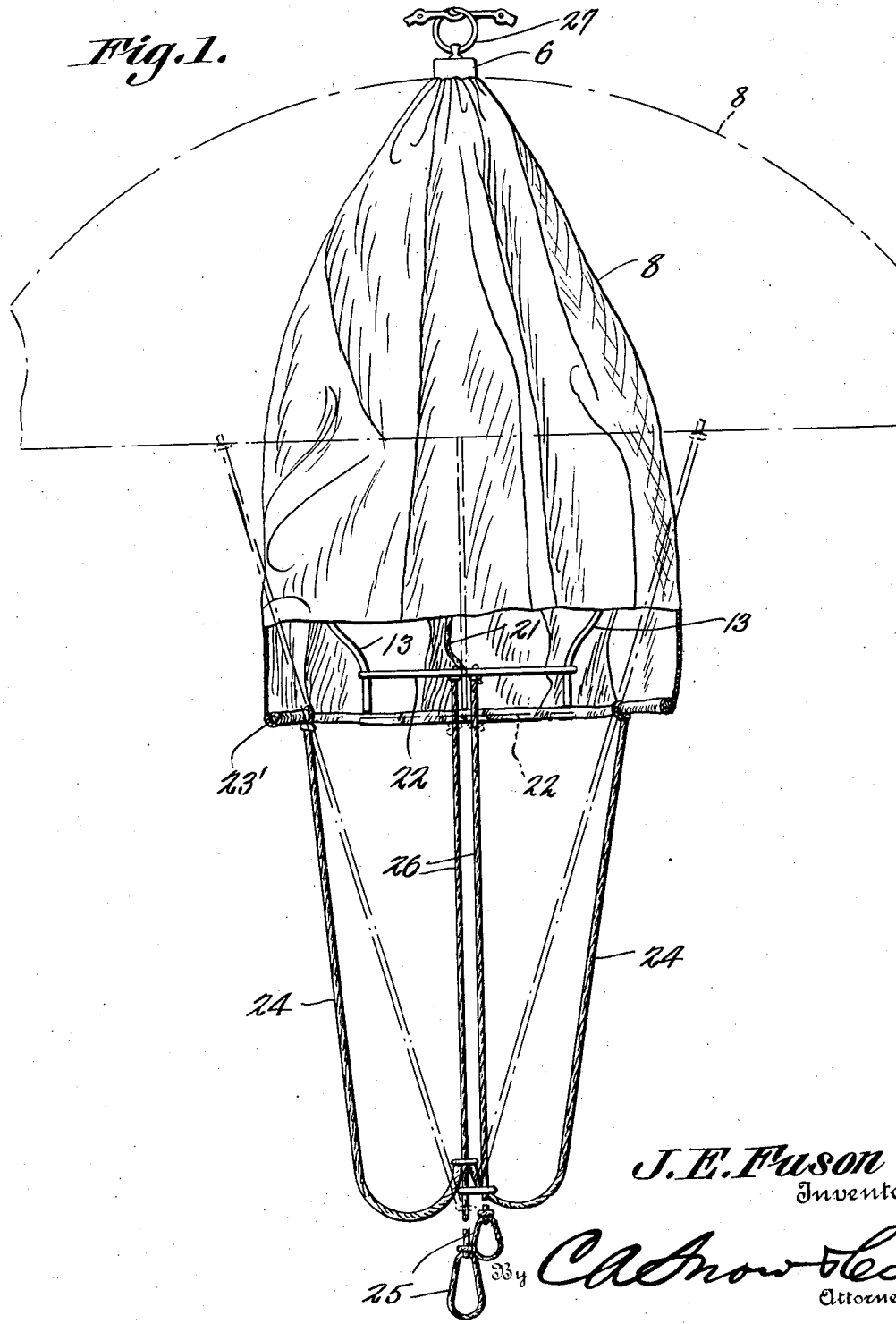

Patented Aug. 24, 1926.

1,596,927

UNITED STATES PATENT OFFICE.

JOHN E. FUSON, OF JOPLIN, MISSOURI.

PARACHUTE.

Application filed March 4, 1926. Serial No. 92,236.

This invention relates to parachutes, the primary object of the invention being to provide a parachute which is strong and durable and one which is exceptionally simple in construction, eliminatng a multiplicity of parts in the construction of the device to insure the opening of the parachute, when brought into use.

Another object of the invention is to provide a parachute which will require small space for storing, and one which may be readily and easily disassembled for facilitating repairing thereof.

A still further object of the invention is to provide supporting arms which are of the spring type, the action of the arms being such as to spread the supporting bows of the parachute to insure a positive opening of the parachute.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is an elevational view illustrating the parachute in its closed position, dotted lines being provided to illustrate the device in an open position.

Figure 2 is a sectional view through the open parachute.

Figure 3 is a view illustrating the securing ring that secures the bows in their closed positions.

Fig. 4 is a sectional view on line 4—4 of Fig. 2.

Referring to the drawings in detail, the device includes a supporting or connecting member 5 which is in the form of a rod circular in cross section.

The reference character 6 indicates the upper securing member which is in the form of a cap fitted over the member 5 and secured thereto by means of rivets 7 as clearly shown by Figure 2 of the drawings.

As shown, the member 6 is formed with a groove disposed adjacent to the upper end thereof, which groove is designed to accommodate the cloth material 8 of which the body of the parachute is constructed, the body 8 being formed with an opening to permit the same to be positioned over the member 6. A securing ring indicated at 9 is positioned within the groove and clamps a portion of the member 8 within the groove in a manner to insure against displacement thereof.

Enlargements 10 are formed on the member 6, which enlargements are formed with openings to accommodate the wire 11 that is passed around the member 6, which wire 11 passes through eyes 12 formed at the inner ends of the bows 13 that are curved and are of lengths to extend to the lower edge of the body portion 8, the free ends of the members 13 being curved outwardly as at 14 for purposes to be hereinafter more fully described.

Bracing ribs 15 are employed in connection with the bows 13 and have loop portions 16 arranged adjacent to their innermost ends, and since the ribs 15 are constructed of resilient material a springing action will take place when the bows 13 are released, with the result that the bows will be spread outwardly to a position as shown by Figure 2.

At the outer ends of the ribs 15 are eyes 17 that are substantially large and embrace portions of the bows 13 in such a way that free and easy movements of the bows 13 with respect to the ribs 15 will be permitted to insure against the bows and ribs binding to prevent the true operation of the parachute.

Mounted on the member 5 is a sleeve 18 which is secured in position by means of the bolt 19 that passes therethrough. The lower end of the sleeve 18 is formed with an opening to accommodate the ring 20, which ring affords means for connecting the rope or flexible member 21 to the member 18.

This member 21 is also connected with the securing ring 22 that is formed with spokes 23 for bracing the ends, the connection between the member 21 and the member 22 being made by attaching the member 21 to the spokes 23 in a manner as shown by Figure 3 of the drawings.

The lower portion of the body 8 is reinforced by the flexible member 23' to which the supporting cables 24 are connected, which supporting cables extend downwardly and have connection with the loop 25 that may be of any desired construction, or which may be in the form of a harness to be strapped around the body of the user.

From the foregoing it will be obvious that due to this construction, the bows may be swung towards each other, and the ring 22 slipped over the curved extremities of the bows 13, to the end that the parachute will be held in a closed position or in a position as shown by Figure 1 of the drawings.

It will be obvious that when weight is brought to bear on the ring 22, which is connected with the member 25 by means of the cables 26, the ring will be pulled downwardly or away from the bows 13 with the result that the ribs 15 will spring outwardly throwing the body portion of the parachute to its open or supporting position.

At the upper end of the member 6, is a ring 27 which may be employed as a medium for hanging the parachute from a suitable support.

I claim:—

1. In a parachute construction, a connecting member, a securing member mounted on the connecting member, said securing member having a groove formed therein, a body portion having a portion thereof fitted within the groove, means engaging the body portion for holding the body portion within the groove, bows secured to the securing member, ribs secured to the securing member and cooperating with the bows to normally urge the bows outwardly, and means for automatically releasing the bows to permit them to spread the body portion.

2. In a parachute construction, a connecting member, a body portion secured to the connecting member, bows pivotally secured to the connecting member, spring ribs having eyes at their outer ends adapted to accommodate the bows to slidably connect the bows and ribs, said ribs adapted to normally urge the bows outwardly, and means for holding the body portion in a folded condition.

3. In a parachute construction, a body portion formed of cloth material, ribs for moving the body portion to an open position, bows connected with the ribs and having connection with the body portion to hold the body portion in an extended position, a securing ring adapted to be positioned over the free ends of the bows to normally hold the body portion closed, supporting cables connected with the ring, said supporting cables adapted to be drawn under the weight of a person using the parachute to remove the securing ring.

In testimony that I claim the foregoing as my own, I have hereto affixed my signature.

JOHN E. FUSON.